United States Patent
Lichtenberger et al.

(10) Patent No.: US 7,678,340 B2
(45) Date of Patent: Mar. 16, 2010

(54) ESTERIFICATION AND TRANSESTERIFICATION SYSTEMS, METHODS AND APPARATUS

(75) Inventors: Philip L. Lichtenberger, Thousand Oaks, CA (US); Alan McGrevy, Camarillo, CA (US); Eric Gulliver, Gambrills, MD (US)

(73) Assignee: Four Rivers Bioenergy, Inc., Calvert City, KY (US)

( * ) Notice: Subject to any disclaimer, the term of this patent is extended or adjusted under 35 U.S.C. 154(b) by 205 days.

(21) Appl. No.: 11/686,913

(22) Filed: Mar. 15, 2007

(65) Prior Publication Data
US 2007/0219340 A1 Sep. 20, 2007

Related U.S. Application Data

(60) Provisional application No. 60/784,434, filed on Mar. 20, 2006.

(51) Int. Cl.
*B01J 19/18* (2006.01)
(52) U.S. Cl. .................. 422/135; 422/131; 526/88; 528/271; 528/272; 368/92; 368/279; 368/348
(58) Field of Classification Search ................ 366/279, 366/348, 315, 342, 165.1, DIG. 1, DIG. 2, 366/DIG. 3, DIG. 4, 92; 241/1; 528/272, 528/271, 295.5; 422/188, 224, 131, 135; 526/88
See application file for complete search history.

(56) References Cited

U.S. PATENT DOCUMENTS

| 6,471,392 B1 * | 10/2002 | Holl et al. .................. 366/279 |
| 2003/0043690 A1 | 3/2003 | Holl |
| 2003/0175182 A1 | 9/2003 | Teall et al. |
| 2004/0013587 A1 | 1/2004 | Holl et al. |
| 2006/0009608 A1 | 1/2006 | Wilhelm et al. |

OTHER PUBLICATIONS

International Search Report for PCT Application No. PCT/US07/64313.

* cited by examiner

*Primary Examiner*—Ling-Siu Choi
*Assistant Examiner*—Frances Tischler
(74) *Attorney, Agent, or Firm*—Greenberg Traurig LLP

(57) ABSTRACT

Esterification and transesterification methods, systems and apparatus are disclosed which increase the efficiency of esterification reactions. The methods comprising utilizing an annular gap reactor comprises a rotor rotating within a stator to provide an annular flow passage comprising a flow path containing a high-shear treatment zone in which the passage spacing is smaller than in the remainder of the zone to provide a subsidiary higher-shear treatment zone. In exemplary embodiments, the reactor is modified to include an evaporator portion including an opening in the stator near the end of the reactor and a series of fins placed in the opening. Increase in the rates due to the annular gap reactor allow for the use of less catalyst, poorer catalysts, lower temperature and reduction in unwanted side reactions at more economically favorable conditions.

15 Claims, 5 Drawing Sheets

# ESTERIFICATION AND TRANSESTERIFICATION SYSTEMS, METHODS AND APPARATUS

This application claims the benefit of priority to U.S. Provisional Application Ser. No. 60/784,434, filed on Mar. 20, 2006 and entitled "Esterification and Transesterification Systems, Methods and Apparatus", which is incorporated by reference in the present application in its entirety

BACKGROUND

1. Field

An apparatus for esterification and transesterification reactions and associated methods of use is disclosed. More particularly, methods, systems and apparatus are disclosed which increase the efficiency of esterification and transesterification reactions.

2. General Background

Various methods for esterification and transesterification reactions are well known. Esterification reactions are chemical reactions in which two chemicals (typically an alcohol and an acid) form an ester as the reaction product. A typical reaction would include reacting a carboxylic acid and an alcohol in the presence of an catalyst to form the ester and water byproduct.

Transesterification is a special type of an esterification reaction wherein the process involves exchanging the alkoxy group of an ester compound by another alcohol. An ester is reacted with an alcohol to produce a different ester and a different alcohol or glycol.

One known application of such reactions is the transesterification of biomass with methanol to produce methyl esters of the fatty acids. When these esters are produced to replace or augment petroleum derived diesel fuel, the product is known as biodiesel. In the United States, the acceptability of the product for use as a fuel is governed by specifications set by the ASTM. ASTM D6751 specification sets the standards for biodiesel.

Biomass includes a variety of different materials, including vegetable oils, animal fats, fish oils, plant oils, and recycled cooking greases. Any one of these can be processed with methanol to produce biodiesel and other products including glycerine.

Although the processing of biodiesel is quite well known, improvements are continually being sought because of the economic sensitivity of every part of the process. When food related materials are being processed for fuel use, the key issue is the expense associated with the entire process in order to make the fuel use competitive.

Thus, there is a need to increase the efficiency of the process. A system and method could be improved by increasing the reaction rate. Also, use of cheaper and/or less catalysts would make the process less expensive and more viable.

SUMMARY

In one aspect of the present disclosure, a method to efficiently conduct esterification and transesterification reactions is disclosed. The method involves providing an annular gap reactor to provide more efficient mixing, wherein the annular gap reactor is operating in laminar flow conditions in the absence of Taylor vortices. Reactants are introduced into the annular gap reactor, and mixed to produce the desired ester.

In another aspect, the annular gap reactor comprises a rotor rotating within a stator to provide an annular flow passage comprising a flow path containing a high-shear treatment zone in which the passage spacing is smaller than in the remainder of the zone to provide a subsidiary higher-shear treatment zone.

In another aspect, the annular gap reactor may be modified to provide an evaporator attached to the annular gap reactor, the evaporator including an opening in the stator near the end of the reactor and a series of fins placed in the opening.

In a further aspect, a reactor is disclosed that encompasses a closed system continuous reactor that can increase esterification reaction rates over that of traditional batch style reactions. In some examples, reactor esterifications were 5-120 times faster than with batch systems.

In another aspect of the disclosure, equipment and reagents can help drive the reaction past batch equilibrium yields.

In a further aspect, higher shear rates in the reactor lead to higher yields. Additionally, higher catalyst loadings increase the reaction rate.

In an exemplary embodiment, a transesterification reaction of vegetable oil with methanol to produce methyl esters (biodiesel) was performed in the reactor. The use of the reactor greatly increases the speed of the main reaction. The increase in reaction rate due to use of the annular gap reactor is of much greater importance than either temperature or the type of catalyst used.

In a further aspect, the increase in the reaction rates caused by the reactor allow for the use of less catalyst, less efficient catalysts, lower temperatures and reduction in unwanted side reactions at more economically favorable conditions. In particular embodiments, sodium hydroxide can be utilized, instead of the more expensive sodium methoxide, as a catalyst in the annular gap reactor disclosed herein achieving equivalent yields with less residence time.

DRAWINGS

Particular preferred embodiments of the disclosure will now be described, by way of example, with reference to the accompanying diagrammatic drawings, wherein.

DETAILED DESCRIPTION

Particular embodiments are described below in considerable detail for the purpose of illustrating various teachings, principles and methods of operation. However, various modifications may be made and the scope of the disclosure is not limited to exemplary embodiments described herein.

In particular embodiments, various esterification reactions are operable connected to a reactor apparatus having a chamber or an annular processing gap/processing passage though which reactants are passed. U.S. Pat. Nos. 5,279,463, 5,538,191, 6,471,392 and 6,742,774 disclose various apparatus that can be modified and utilized in accordance with various aspects of the teachings of the present disclosure and are herein referred to as a annular gap reactor. In the apparatus and system disclosed herein, esterification reactions are precisely controlled as reactants pass through the annular gap/processing passage of the reactor apparatus. In another aspect, the apparatus disclosed herein also provides a novel evaporation method.

U.S. Pat. Nos. 5,279,463 (issued Jan. 18, 1994) and 5,538,191 (issued Jul. 23, 1996) disclose methods and apparatus for high-shear material treatment, one type of the apparatus consisting of a rotor rotating within a stator to provide an annular flow passage comprising a flow path containing a high-shear treatment zone in which the passage spacing is smaller than in the remainder of the zone to provide a subsidiary higher-shear treatment zone in which free supra-Kolmogoroff eddies are suppressed during passage of the material therethrough.

U.S. Pat. No. 6,741,392 is also directed to methods and apparatus for material mixing, in particular, mixing that is carried out under conditions and configurations that provide reduction of Taylor vortices.

When the annular gap reactor is in the range as described in this disclosure, flow within the gap is laminar, with no Taylor vortices. Thus, the shear force experienced by the flow is uniform. For example, the flow does not pass through the regions of high shear force in the laminar zone, through regions of different shear force in the Taylor currents, to regions of low shear force in the eddies of the Taylor vortices.

Figure 1:
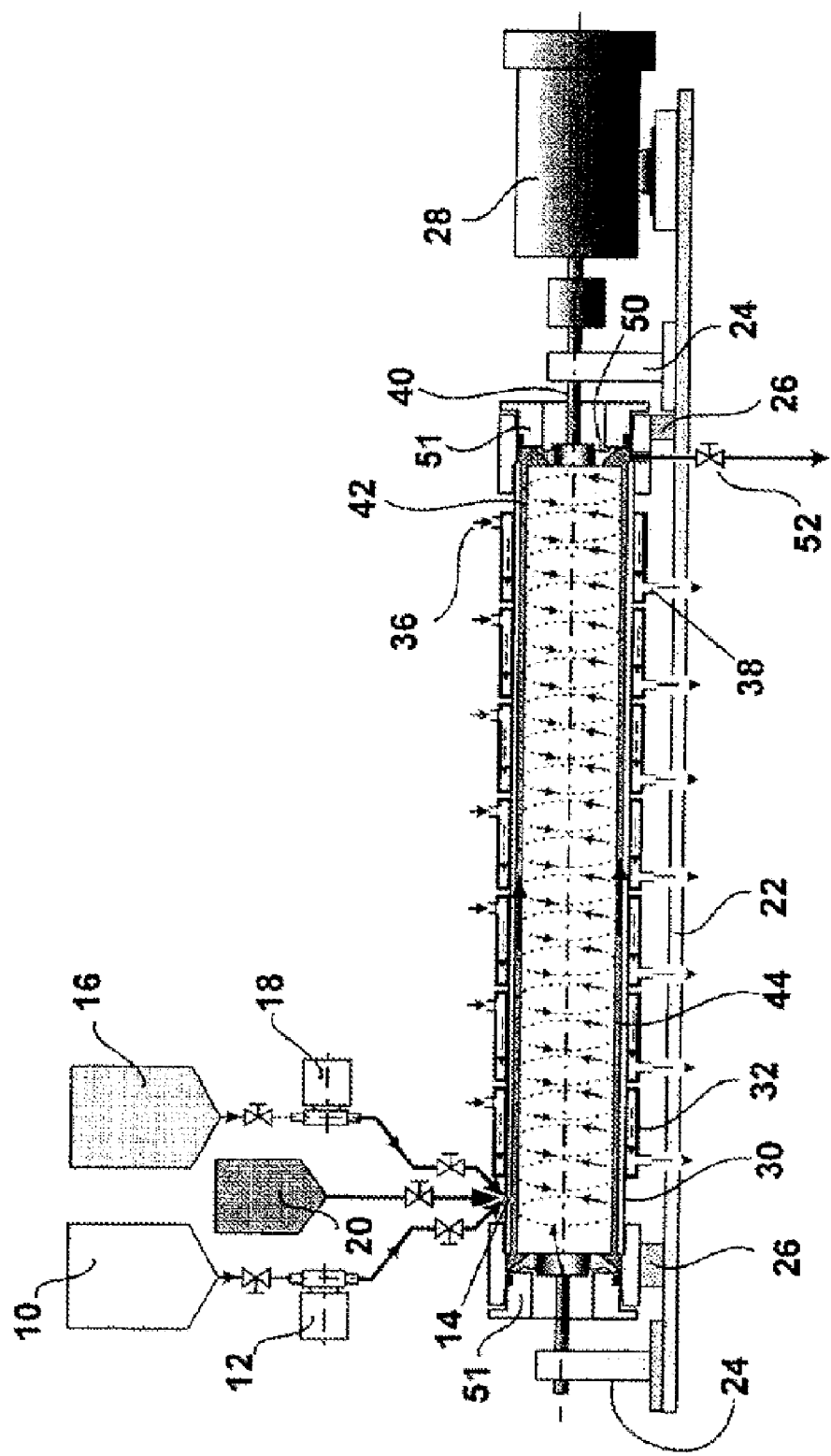
FIG. 1 illustrates a part elevational, part longitudinal cross section through a complete annular gap reactor.
Figure 2:
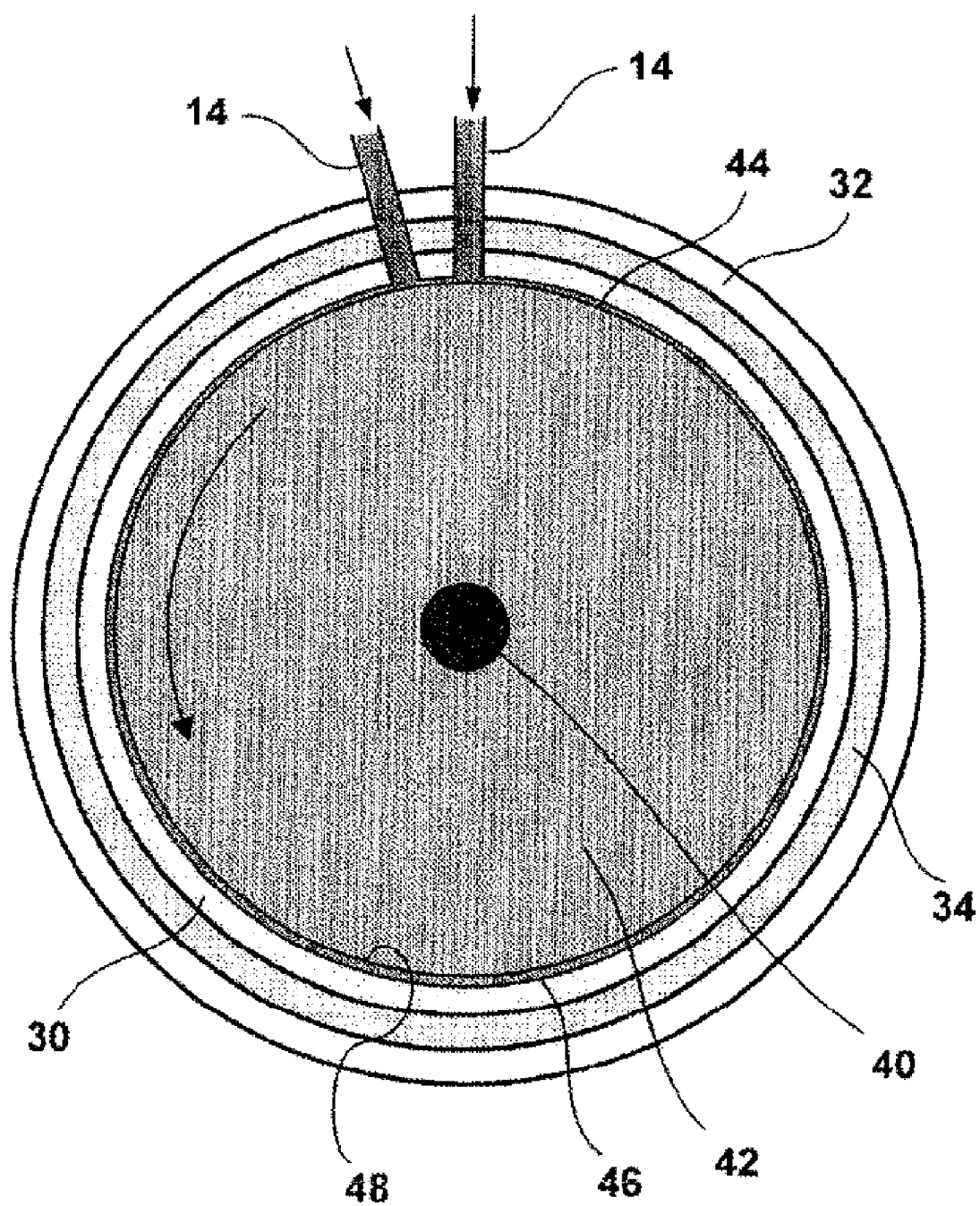
FIG. 2 illustrates a transverse cross section of the annular gap reactor of FIG. 1 to show the cylindrical members and their relation to one another.

In the system illustrated by FIG. 1, a first reactant (Reactant A) is fed from a supply tank 10 via a metering pump 12 to inlet 14, while a second reactant (Reactant B) is fed from a supply tank 16 via a metering pump 18 to the same inlet 14. If required, an optional catalyst or reactant gas is fed from a supply tank 20 to the inlet 14. If separate inlets 14 are used then they must be in close tangential proximity to one another. The processing apparatus comprises a baseplate 22 on which is mounted rotor bearing supports 24, stator supports 26 and a variable speed electric drive motor 28. A cylindrical tube 30 comprising the apparatus stator is mounted on supports 24, and in turn supports along the major portion of its length another cylindrical tube 32 constituting the outer casing of a heat exchanger through which gas or liquid can be passed to control the temperature in the processing chamber. As illustrated in FIG. 2, the annular passage 34 between the cylinders 30 and 32 can be filled with a suitable heat exchange medium, the coolant (or heating fluid if appropriate) entering through inlets 36 and discharging through exits 38. A rotor shaft 40 extends between the supports 24 and is supported thereby, one end of the shaft being connected to the motor 28. The shaft carries a cylindrical rotor 42, which in this embodiment is solid and has its axis of rotation coincident with the longitudinal axis of the stator cylinder 30. An annular cross section processing chamber 44 is formed between the inner cylindrical surface 46 of stator 30 and outer cylindrical surface 46 of rotor 42 and face body 51; the ends of the chamber are closed against leakage by end seals 50 that surround the shaft 40. The reacted material is discharged through an outlet 52.

As the material being processed flows in the processing passage 44 a respective boundary layer forms on each of the cylindrical surfaces 46 and 48, the thickness of which is determined by the viscosity and other factors of the material being processed and the relative flow velocity of the material over the surface.

The internal diameter of the stator surface 46 and the external diameter of the rotor surface 48 are such that the radial dimension of the processing passage 44 is approximately equal to the combined thicknesses of the two laminar boundary layers back-to-back, so that there is no room between them for an intervening bulk layer to turn turbulent and would permit Taylor vortices to be formed and disrupt the thorough and uniform mixing that takes place with the material in the two contacting boundary layers.

As known in the art, there are various aspects to fluid flow in an annulus such as the annular gap/processing passage 44 disclosed herein, such as Reynolds Numbers, Taylor Numbers, shear rates and shear stress. The literature lists several versions of both Reynolds number (Re) and Taylor number (Ta). These dimensionless numbers are ultimately ratios of the momentum in a fluid flow and the viscous forces in the fluid. When viscous forces dominate, flows tend to be laminar and Re and Ta are low, but when momentum dominates the flow, the flow tends toward turbulence and Re and Ta are high. The different versions of Re and Ta result from adapting the equations to different flow configurations. Thus, there are Reynolds numbers for pipe flow, flow in a slot, axial annular flow and tangential annular flow. In the case of a stator 30 and rotor 42, Taylor numbers are specific to annular flow with an inner cylinder (e.g. rotor 42) rotating, but the definitions appear to vary especially when it comes to the critical Taylor numbers used to define the transitions between laminar and turbulent flow. FIG. 2 represents a cross section through the stator and rotor assembly of FIG. 1.

If the cooperating surfaces 46 and 48 in FIG. 2 are coated with a catalyst to facilitate a chemical reaction that constitutes the processing step. The coatings applied must still meet the criteria of the invention as to smoothness in order to obtain the superior mixing that results.

Figure 3:
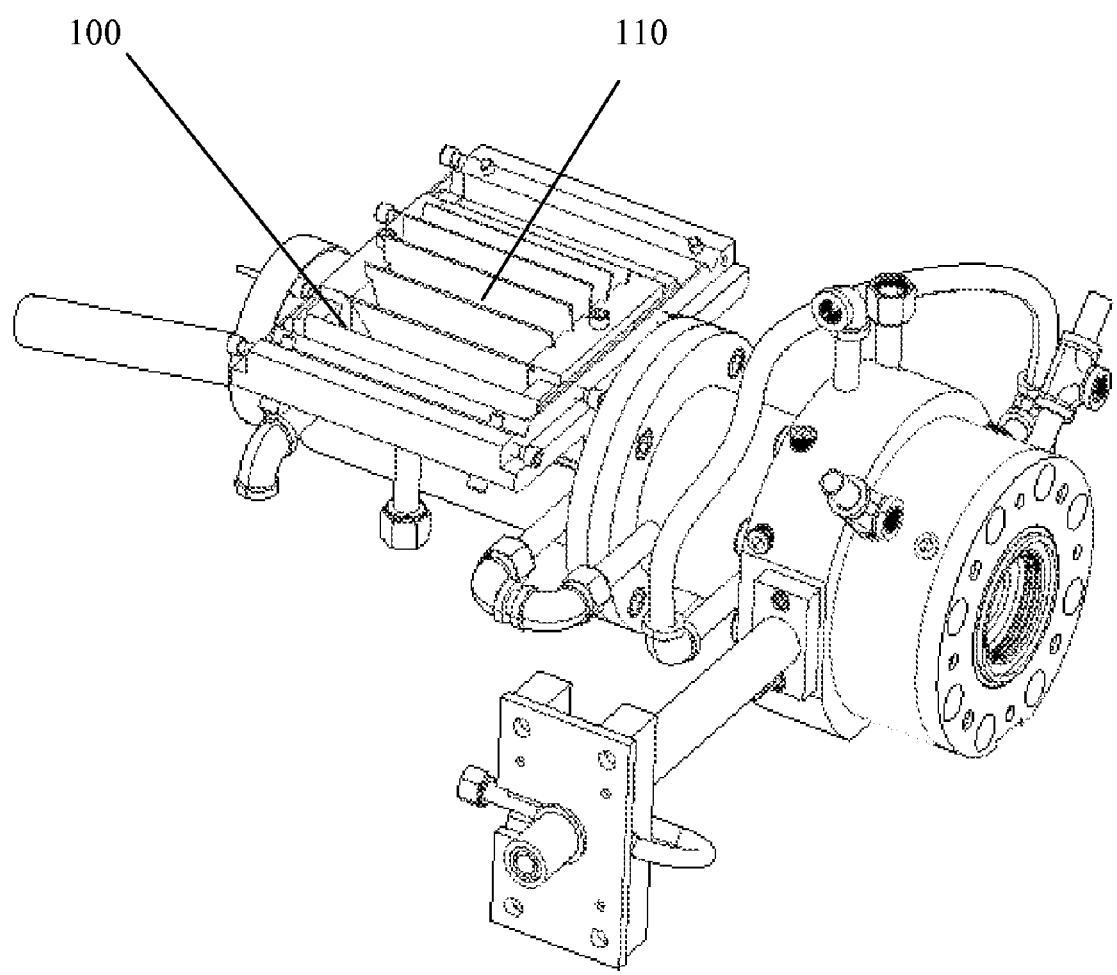
FIG. 3 illustrates an exemplary esterification and transesterification reactor apparatus utilizing a modified annular gap reactor.

FIG. 3 depicts another exemplary reactor apparatus, modified from the embodiment shown in FIG. 1 to include an evaporator portion along the length of the rotor. This evaporator modified annular gap reactor is equipped with a stator that was opened to allow volatile gases and vapors to be released. In exemplary embodiments, the stator opening 100 is placed next to the exit end of the reactor and, in exemplary embodiments, is approximately ⅓ the length of the rotor. A series of fins 110 is placed in the opening. The bottoms of the fins are curved in the direction of the rotor rotation and were placed just above the rotor. The fins 110 prevent fluid in the reactor from being flung off the rotor once it reaches the opening. The fins 110 also allow gasses and vapors to escape from the rapidly sheared fluid surface. The opening 100 in the stator is constructed so that a tent-like condenser could be placed over the opening to collect the vapors escaping from the reaction. Additionally, vacuum may be pulled to lower operating temperatures as well.

Taylor rings (vortices) have not been observed in a rotor/stator device/process as described herein. In addition, the calculations that follow suggest that the experimentally determined upper bound of the preferred conditions may coincide with the formation of Taylor vortices. The lack of Taylor rings allows us to apply a uniform shear force. If there are Taylor rings, it means there will be both currents and eddies. Each of these will apply a different amount of shear. The laminar flow generating the Taylor vortices will apply a third amount of shear.

The boundaries between laminar and turbulent flow seem to coincide with the upper boundary of the preferred conditions as outlined below. The discussion of the different versions of Reynolds and Taylor numbers are included as a way to reconcile differences and to show that they tend to coincide with the experimentally determined upper bound of the preferred conditions, and to provide a method for determining operation conditions in different mechanical configurations with different cell cultures and media. Bird, Stewart and Lightfoot ("Transport Phenomena", R. B. Bird, W. E. Stewart and E. N. Lightfoot, John Wiley & Sons, New York, (1960), pp. 96) define the Reynolds number for tangential flow in an annulus ($Re_{BSL}$) and the critical Reynolds number for transition from laminar to turbulent flow as:

$$Re_{BSL} = \left(\frac{\Omega \kappa R_o^2 \rho}{\mu}\right) \square \left(\frac{41.3}{(1-\kappa)^{3/2}}\right)_{critical} \qquad (0.1)$$

Where:

$\Omega$=angular velocity of the inner cylinder (radians/s or 1/s), $\kappa$=radius of the inner cylinder divided by radius of the outer cylinder (none), $R_o$=radius of the outer cylinder (m), $\rho$=fluid density (kg/m³) and $\mu$=fluid viscosity (kg/m s)

Defined also is the Reynolds number for axial flow in an annulus ($Re_z$) (on pp. 54) and note that the transition from laminar to turbulent flow occurs at Reynolds numbers of about 2000. For example and in this case, the Reynolds number is:

$$Re_z = \frac{2R_o(1-\kappa)\langle v_z \rangle \rho}{\mu} \qquad (0.2)$$

Where:

$R_o$=radius of the outer cylinder (m), $\kappa$=radius of the inner cylinder divided by radius of the outer cylinder (none), $\langle v_z \rangle$=average fluid velocity in axial direction (m/s), $\rho$=fluid density (kg/m³) and $\mu$=fluid viscosity (kg/m s).

In another work, Kataoka ("Taylor Vortices and Instabilities in Circular Couette Flows", K. Kataoka, pp 236-274, in *Encyclopedia of Fluid Mechanics, Vol. 1 Flow Phenomena and Measurement*, Ed. N. P. Chereminisinoff, Gulf Publishing Co., Houston, (1986), on p. 238) defines the Reynolds number for tangential flow ($Re_K$) as:

$$Re_K = \frac{R_i \Omega d}{\nu} = \frac{R_i \Omega d \rho}{\mu} \qquad (0.3)$$

Where:

$R_i$=inner cylinder radius (m), $\Omega$=angular velocity of inner cylinder (1/s), d=annulus gap width (m), $\nu$=fluid kinematic viscosity [Note: $\nu=\mu/\rho$] (m²/s), $\mu$=fluid viscosity (kg/m s) and $\rho$=fluid density (kg/m³)

At the same time Kataoka defines the Taylor number ($Ta_K$) as:

$$Ta_K = \frac{R_i \Omega^2 d^3}{\nu^2} = \frac{R_i \Omega^2 d^3 \rho^2}{\mu^2} \qquad (0.4)$$

Where, $R_i$=inner cylinder radius (m), $\Omega$=angular velocity of inner cylinder (1/s), d=annulus gap width (m), $\nu$=fluid kinematic viscosity [Note: $\nu=\mu/\rho$] (m²/s), $\mu$=fluid viscosity (kg/m s) and $\rho$=fluid density (kg/m³)

In this work, Kataoka goes on (p. 243) to define the critical Taylor number ($Ta_c$) as the threshold below which "infinitesimal disturbances are damped owing to the action of viscosity" and above which "some of them are amplified with increasing time". This is taken to mean that $Ta_c$ is the threshold for formation of Taylor rings (a.k.a., Taylor vortices). It is stated therein, that for very narrow gap widths (i.e., $d/r_i \ll 1$) $Ta_c$ approaches 1,708 but that it tends to increase with increasing $d/R_i$.

In an example, he states that when $d/r_i=0.33$, $Ta_c=2,453$. Kataoka provides two equations for estimating $Ta_c$;

$$Ta_c = \frac{\pi^4\left(1 + \frac{d}{2R_i}\right)}{0.0571\left(1 - \frac{0.652d}{R_i}\right) + 0.00056\left(\frac{0.652d}{R_i}\right)^{-1}} \qquad (0.5)$$

and, for $d \ll R_i$;

$$Ta_c = 1695\left(1 + \frac{d}{2R_i}\right) \qquad (0.6)$$

where, d=annulus gap width (m), and $R_i$=inner cylinder radius (m).

Kataoka further notes that as the rotor rpm increases, the Taylor rings become unstable such that the vortex boundaries are S-shaped or wavy. There is a second critical Taylor number ($Ta_w$) and a second critical Reynolds number ($Re_w$) that corresponds to this instability. $Ta_w$ and $Re_w$ both depend on the radius ratio of the rotor and stator ($\eta=R_i/R_o$).

Schlichting ("Boundary-Layer Theory", 7th ed., H. Schlichting (translated by J. Kestin), McGraw-Hill, Inc., New York, (1955) [Reissued in 1987] on pp. 526-529) gives the following equation for the Taylor Number ($Ta_S$):

$$Ta_S = \frac{Ud}{v}\sqrt{\frac{d}{R_i}} = \frac{Ud\rho}{\mu}\sqrt{\frac{d}{R_i}} \quad (0.7)$$

Where,

U=the peripheral or surface velocity of the inner cylinder (m/s), d=the gap width between the two concentrically placed cylinders (m), v=fluid kinematic viscosity (m$^2$/s), $R_i$=radius of the inner cylinder (m), $\rho$=fluid density (kg/m$^3$) and $\mu$=fluid viscosity (kg/m s).

Schlichting gives $Ta_c$ as 41.3 and states that for 41.3<Ta<400 flow is laminar with Taylor vortices while flows with Ta>400 are turbulent.

Bird, Stewart and Lightfoot's tangential Reynolds number, Kataoka's Taylor number and Schlichting's Taylor produce widely different values for the same flow conditions but if the results are examined in terms of the transition or critical numbers provided with each equation the results are in close agreement. In other words, if Bird, Stewart and Lightfoot's tangential Reynolds number is larger than the critical value for flow instability, Kataoka's and Schlichting's Taylor numbers will be greater than their respective critical values as well.

A guiding principle of fluid mechanics is the no slip rule. This states that fluid in contact with a surface moves at the same velocity as the surface. This produces a velocity in a fluid bounded by two surfaces when one surfaces moves relative to the other. This gradient is called shear rate and is a useful measure of how intensely a material is sheared. Shear Rate ($\gamma$) has units of s$^{-1}$ and is a function of the rotor surface velocity and the rotor-stator gap.

$$\gamma = \frac{U}{d} \quad (0.8)$$

Where,

U=the peripheral of surface velocity of the inner cylinder (m/s) and d=the gap width between the two concentrically placed cylinders.

Shear stress ($\sigma$) is a measure of the shearing force applied to a material and has units of kg/m s$^2$. Since it reflects the force applied to a fluid, it is more likely to reflect the impact a given set of flow conditions will have on cellular organisms. It is possible to subject a fluid to high shear rates but low shear stress. This is because shear stress is a function of shear rate and viscosity.

$$\sigma = \mu\gamma \quad (0.9)$$

Where, $\mu$=viscosity (kg/m s) and $\gamma$=shear rate.

Experiments

To show the improved performance of the method and apparatus providing esterification and transesterification reactions described herein, several examples of esterification reactions were completed in a batch reactor, an annular gap reactor, and a modified annular gap reactor including an evaporator.

Bench-top reactions were carried out in a 500 ml glass reaction kettle. The lid of the kettle had four ports, three around the periphery and the fourth in the center of the lid. An impeller whose shaft entering the reactor through the center port was used to stir the reaction. Reaction temperature was monitored via a thermometer or thermocouple inserted through one of the ports. An inert purge gas was fed through another port. When samples were taken the purge gas feed was removed from the port so that a sampling cup could be inserted into the reactor. A condenser equipped with a gas bubbler was attached to the remaining port when the reaction was run under equilibrium conditions (i.e., when water evolved in the reaction was retained in the reaction). When the reaction was run under non-equilibrium conditions, a distillation head was attached to the condenser, and a collection flask and gas bubbler were placed at the end of the distillation head. An electric heating mantle was used to heat the reaction mixture. The temperature of the heating mantle was controlled with a rheostat. Four reaction systems were examined on the bench-top. The reactants, and reactant stoichiometries for each of the reactions are given in Table 1.

TABLE 1

Reaction Stoichiometries

| Reaction # | Acid | Alcohol | Catalyst |
|---|---|---|---|
| 1 | Oleic acid (1.00 moles) | n-butanol (1.15 moles) | Sulfuric acid (0.5 wt % & 2.5 wt %) |
| 2 | Oleic acid (1.00 moles) | 2-ethyl-1-hexanol (1.15 moles) | p-toluenesulfonic acid (0.55 wt %) |
| 3 | Adipic acid (1.00 moles) | 2-ethyl-1-hexanol (2.15 moles) | Fascat 4102 (0.2 wt %) |
| 4 | Succinic acid (1.00 moles) | Propylene glycol (1.10 moles) | Fascat 4102 (0.3 wt %) |

Note:
Fascat 4102 is a trademarked product of Atofina. The active ingredient (>98%) is butyltin tris(2-ethylhexanoate), CAS# 23850-94-4.

All of the reactions shown in Table 1 were performed in an annular gap reactor. Two annular gap reactors were used for the esterification experiments. The size and shape of the annular gap reactors were designed based on the above theories, allowing laminar flow in the reactor, and preventing the formation of Taylor vortices. A annular gap reactor with Size X was used for reaction 1 and an annular gap reactor with Size Y was used for reactions 2-4. Size X reactors control reaction temperature via a heat exchanger wrapped around the stator. In addition to the external heat exchanger, Size Y reactors have a heat exchanger inside the rotor. The crucial reactor dimensions and the shear rates that the reactants were exposed to are summarized in Table 2.

TABLE 2

Annular Gap Reactor Conditions

| Reaction # | Annular Gap Reactor Model | Reactor Working Volume (ml) | Stator I.D. (cm) | Rotor/Stator Gap (μm) | Shear Rate (s$^{-1}$) |
|---|---|---|---|---|---|
| 1 | X | 7.64 | 4.76 | 318 | 38,746 |
| 2 | Y | 22.92 | 6.43 | 381 | 43,633 |

TABLE 2-continued

Annular Gap Reactor Conditions

| Reaction # | Annular Gap Reactor Model | Reactor Working Volume (ml) | Stator I.D. (cm) | Rotor/Stator Gap (μm) | Shear Rate ($s^{-1}$) |
|---|---|---|---|---|---|
| 3 | Y | 22.92 | 6.43 | 381 | 15,184 & 21,817 |
| 4 | Y | 22.92 | 6.43 | 381 | 43,633 |

Two esterification reactions were examined in an evaporator modified annular gap reactor. Table 3 provides the reagents and their stoichiometries. The condenser, or tent, was used for reaction 7 but not for reactions 5 and 6. Table 4 provides the evaporator modified annular gap reactor conditions.

TABLE 3

Evaporator Annular Gap Reactor Reaction Stoichiometries

| Reaction # | Acid | Alcohol | Catalyst |
|---|---|---|---|
| 5 | Stearic acid (1 mole) | n-butanol (4.91 moles) | p-toluenesulfonic acid (0.55 wt %) |
| 6 | Stearic acid (1 mole) | n-butanol (2.47 moles) | p-toluenesulfonic acid (0.55 wt %) |
| 7 | Oleic acid (1 mole) | 2-ethyl-1-hexanol (2.32 moles) | benzenesulfonic acid (0.55 wt %) |

TABLE 4

Evaporator Annular Gap Reactor Conditions

| Reaction # | Approximate Working Volume (ml) | Stator I.D. (cm) | Reactor Gap (μm) | Evaporator Gap (μm) | Reactor Shear Rate ($s^{-1}$) | Evaporator Shear Rate ($s^{-1}$) |
|---|---|---|---|---|---|---|
| 5 | 23 | 6.43 | 254 | 305 | 67,420 | 33,441 |
| 6 | 23 | 6.43 | 254 | 305 | 67,420 | 33,441 |
| 7 | 26 | 6.43 | 508 | 559 | 56,094 | 30,352 |

Samples from the bench-top and annular gap reactor reactions were analyzed by dissolving the samples in ethanol and titrating with 0.1N sodium hydroxide. Phenolphthalein was used as the indicator and endpoint was taken as the first tinge of pink that lasted 30 seconds or longer. Reaction yield was calculated by comparing the sample titrations with a titration from an unreacted equivalent mixture of the reagents. This method of assessing yield assumes that no mass is lost from the reaction mixture during the reaction. Reactions run in the evaporator modified annular gap reactor lost both evolved water and at least some of the lower boiling alcohols and could not be analyzed via titration. Therefore, high performance liquid chromatography was used to analyze the results of reactions 5 through 7. The high performance liquid chromatography results were calculated on the basis of acid converted to ester.

The reaction temperatures, and reaction yields at comparable times are summarized for all of the reactions in Table 5. In all of the reaction systems, the water retained batch reaction temperature is lower than the water extracted batch reaction and annular gap reactor reaction temperatures. The heating mantle used for the batch reactions was controlled by a rheostat. Rheostat settings of 50% to 70% were sufficient to heat the water extracted batch reactions up to 195° C. but rheostat settings of 100% produced temperatures 25° C. to 50° C. lower. This was attributed to the additional energy required to superheat the water generated by the esterification reaction. The temperatures given for the annular gap reactor reactions are the temperatures of the heating oil passed through the reactor heat exchangers. It is likely that the temperature of the reactants was somewhat lower. In addition, the annular gap reactor is a closed system in that there is no way for the evolved water to escape until the reactants leave the reactor. This means that reaction conditions in the annular gap reactor should be similar to the water retained batch reactions.

The evaporator modified annular gap reactor reaction results have been added to Table 5 where they are most comparable. Reactions 5 and 6 were added to the results from reaction 1 because oleic acid and stearic acid are nearly identical compounds and are expected to have nearly identical reactivity with regard to esterification. It should be noted that these reactions were carried out with much larger excesses of n-butanol. In esterification reactions an excess of alcohol is known to drive the reaction further toward completion. The catalyst, p-toluenesulfonic acid, used in reactions 5 and 6, is a much weaker acid than the sulfuric acid catalyst used in reaction 1. Esterification reactions proceed much faster when using strong acid catalysts and we would expect this difference to slow the rate of reactions 5 and 6 relative to reaction 1. Reactions 5 and 6 would expect to have a higher overall yield but a slower reaction rate than reaction 1, but the results suggest the opposite.

Reaction 7 was added to the results from reaction 2. In this case acid and alcohol are identical but the catalyst benzenesulfonic acid is slightly weaker than the p-toluenesulfonic acid used for reaction 2. The most significant difference is that reaction 7 used 2× more catalyst than reaction 2. The yields from reaction 7 are slightly less than those obtained from reaction 2 but the reaction times are significantly lower. Some of the rate increase may be attributable to the excess alcohol but it seems unlikely all of the rate increase can be explained this way.

TABLE 5

Reaction Temperatures and Yields

| Reaction # | Reaction Type | Temperature (° C.) | Yield |
|---|---|---|---|
| 1 | Batch, water retained | 70-80 | 48% @ 60 min. |
|  | Batch, water extracted | — | — |
|  | Annular Gap Reactor | 115 | 48% @ 0.5 min. |
|  | Evaporator Modified Annular Gap Reactor (Rxn 5 - Stearic acid instead of oleic acid, 4.3X more alcohol, weaker catalyst, | 115 | 99% @ 0.6 min. |

TABLE 5-continued

Reaction Temperatures and Yields

| Reaction # | Reaction Type | Temperature (° C.) | Yield |
|---|---|---|---|
| | different analytic method) | | |
| | Evaporator Modified Annular Gap Reactor | 115 | 96% @ 0.4 min |
| | (Rxn 6 - Stearic acid instead of oleic acid, 2.1X more alcohol, weaker catalyst, different analytic method) | | |
| 2 | Batch, water retained | 115-120 | 89% @ 130 min. |
| | Batch, water extracted | 170-175 | 89% @ 53 min. |
| | Annular Gap Reactor | 170 | 89% @ 10 min. |
| | Evaporator Modified Annular Gap Reactor | 170 | 86% @ 3.5 min. |
| | | | 82% @ 0.9 min. |
| | (Rxn. 7 - 2X more alcohol, weaker catalyst, different analytic method) | | |
| 3 | Batch, water retained | 120-130 | <60% @ 375 min. |
| | Batch, water extracted | 185-195 | 62% @ 100 min. |
| | Annular Gap Reactor | 180 | 62% @ 1.5 min. |
| 4 | Batch, water retained | 134-145 | 41% @ 90 min. |
| | Batch, water extracted | — | — |
| | Annular Gap Reactor | 170 | 41% @ 10 min. |

Figure 4:
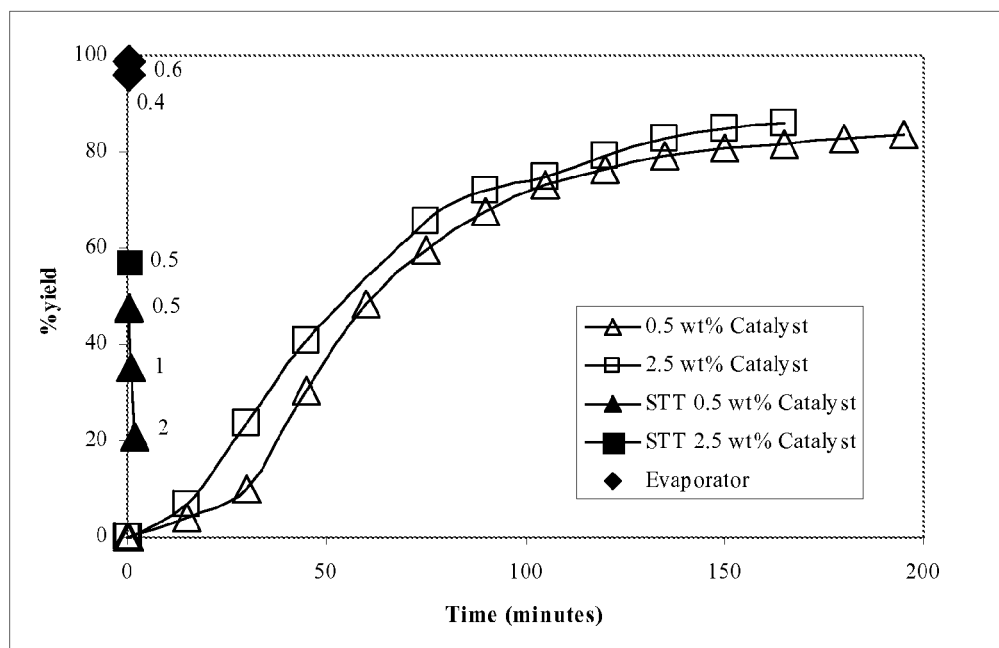
FIG. 4 illustrates a diagram depicting increases in reaction times for the reaction of oleic acid and n-butanol in accordance with the present disclosure compared to a batch reaction.

FIG. 4 compares the batch and annular gap reactor yields as a function of time for Reaction 1 (oleic acid and n-butanol). The reactants were fed into the annular gap reactor in two separate room temperature streams. Two catalyst loadings, 0.5 wt % and 2.5 wt % sulfuric acid, were examined in this reaction. Both the batch and annular gap reactor yields increased when the catalyst loading was increased. Regardless of the catalyst loading comparable yields are obtained in the annular gap reactor much more quickly that in the batch reactor. The values next to the annular gap reactor data points give the reaction times in minutes. For this reaction, the annular gap reactor yields are obtained up to 120 times faster than equivalent yields from the batch reactions. There is also an unexpected trend in the data from the annular gap reactor reaction using 0.5 wt % catalyst. The reaction yield increases from approximately 20% to almost 50% as the residence time is decreased from 2 minutes to 0.5 minutes. An unexpected result such as is possibly caused by changes in the axial flow regime as the flow rate is increased.

Figure 5:
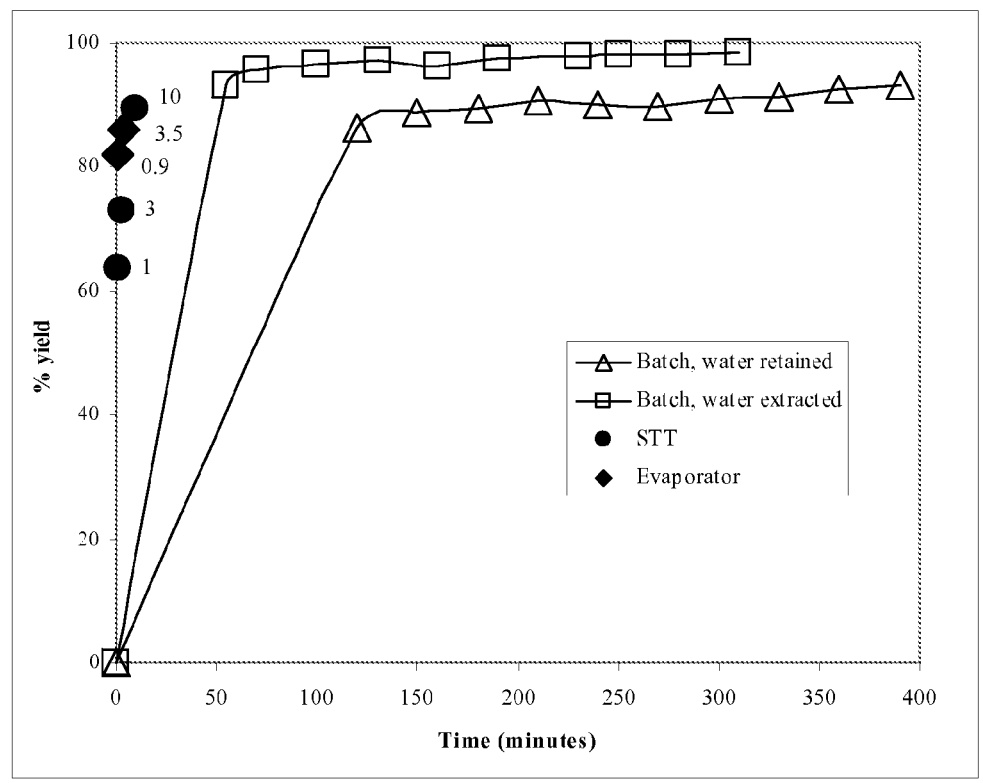
FIG. 5 illustrates a diagram depicting increases in reaction times for the reaction of oleic acid and 2-ethyl-hexanol in accordance with the present disclosure compared to a batch reaction.

FIG. 5 compares the batch and annular gap reactor yields as a function of time for Reaction 2 (oleic acid and 2-ethyl hexanol). In this case, the reagents were premixed and fed into the annular gap reactor as a single room temperature stream. Both the batch and annular gap reactor yields are higher and reaction rates are faster than Reaction 1. This may be due to the more hydrophobic nature of the alcohol. n-Butanol is soluble in water but 2-ethyl hexanol is not. The n-butanol was not dried before use and it may have contained enough water to slow the reaction. Alternatively, the more hydrophobic 2-ethyl hexanol may have induced phase separate of the water and thus minimized its impact on the reaction. In this system the reaction rate in the annular gap reactor did not accelerate as the flow rate was increased. However, the reaction in the annular gap reactor was still 5 to 13 times faster than the batch reaction.

Figure 6:
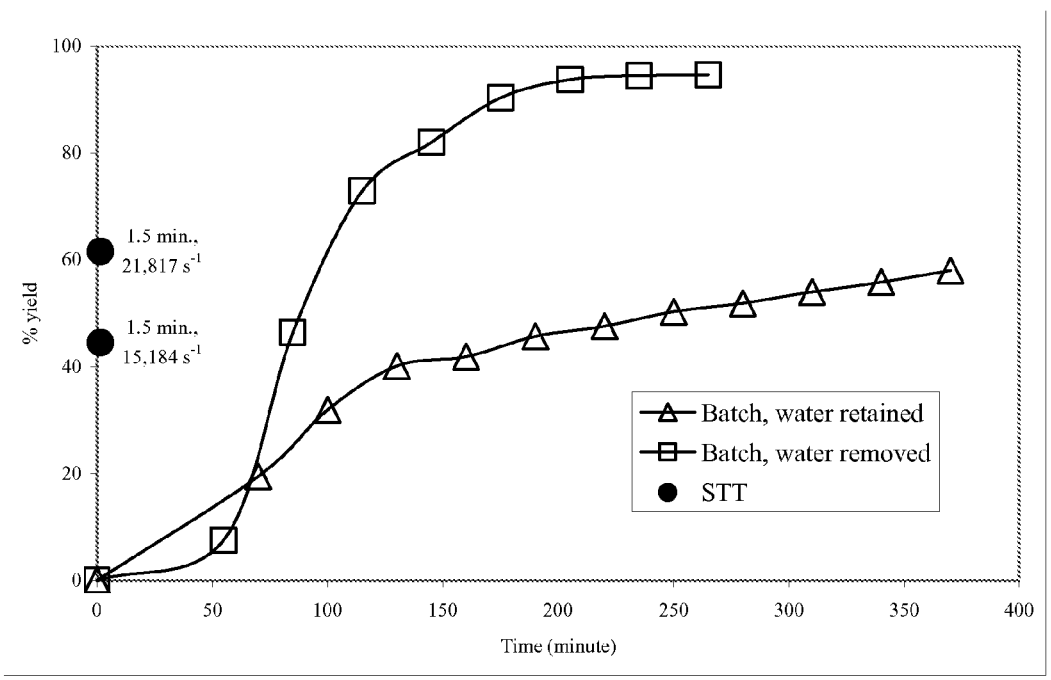
FIG. 6 illustrates a diagram depicting increases in reaction times for the reaction of adipic acid and 2-ethyl-hexanol in accordance with the present disclosure compared to a batch reaction.

FIG. 6 compares the batch and annular gap reactor yields as a function of time for Reaction 3 (adipic acid and 2-ethyl hexanol). This reaction was chosen to examine the esterification of a di-acid. Adipic acid was melted and fed into the annular gap reactor hot. The 2-ethyl hexanol was also heated before introduction into the reactor. Suppression of the reaction rate and yield is clearly visible in the batch reaction that retained the evolved water. In the water retained batch reactions we would expect yield to stabilize at the yield dictated by equilibrium between ester formation and ester hydrolysis. However, after 130 minutes the water retained yield increase slows but continues to increase steadily over time. The batch reactor was opened briefly every time a sample was collected. Water vapor escaped the reactor whenever it was opened and this loss of water would be enough to shift the equilibrium yield slightly higher in favor of the ester. This slow upward trend is seen is all of the water retained batch reactions but is most pronounced for Reactions 3 and 4, and it suggests that the equilibrium water retained yields are somewhat lower than those seen here. The two data points from the annular gap reactor show that increasing the shear rate caused the yield to increase from 45% to 62%. At the higher shear rate the annular gap reactor yield is 67 times faster than a comparable yield in the water extracted batch reaction. In addition, the annular gap reactor yield at the higher shear rate is higher than any yield obtained in the water retained batch reaction. This is remarkable because the annular gap reactor is a closed system that does not allow water to be removed during the reaction. It is expected that the maximum yield would be similar but not greater than the yield from the water retained batch reaction. These results suggest that reactions run the in the annular gap reactor may be able to achieve yields higher than the water limited equilibrium yield.

Figure 7:
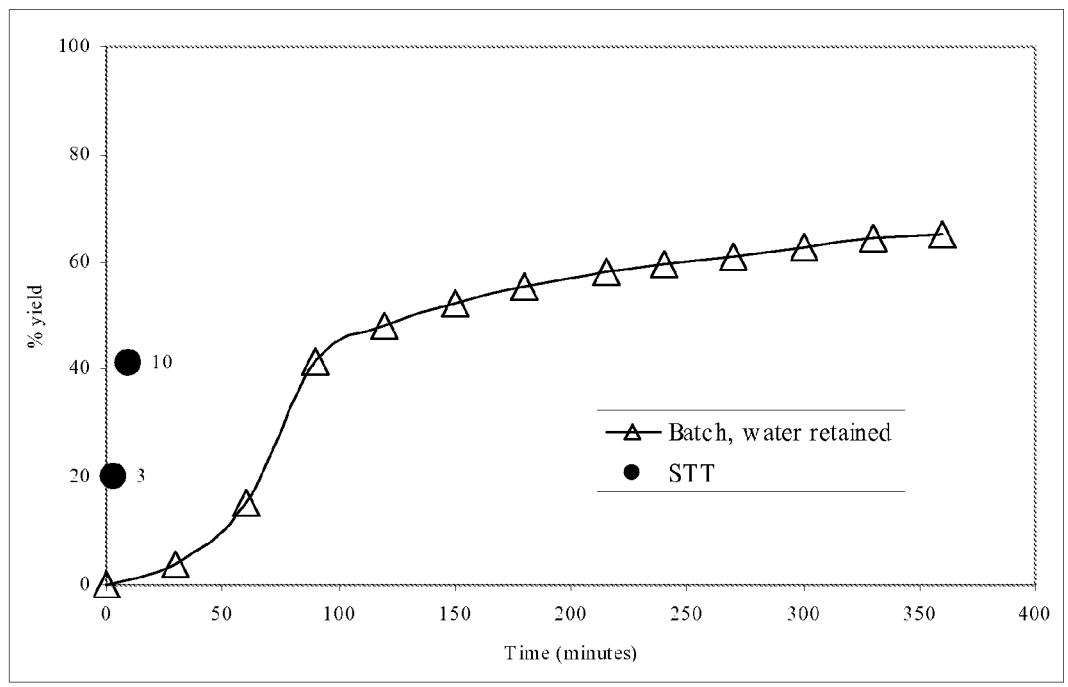
FIG. 7 illustrates a diagram depicting increases in reaction times for the reaction of succinic acid and propylene glycol in accordance with the present disclosure compared to a batch reaction.

FIG. 7 compares the batch and annular gap reactor yields as a function of time for Reaction 4 (succinic acid and propylene glycol). Since this system contains a diol and a diacid it is capable of polymerization which makes it a good analog for commercial polyester reactions. The melting point of succinic acid was too high for it to be fed into the annular gap reactor as a liquid. Therefore the reactants were premixed and fed into the reactor as a room temperature slurry. The reaction was strongly mass transfer limited because the reaction temperatures were below the melting temperature of the succinic acid. As the concentration of ester increases, succinic acid is more soluble but the initial contact between the reagents could only occur at the solid-liquid interface. This is typical of commercial polyester reactions involving either terephthalic acid or isophthalic acid. For this reaction, the yield from the annular gap reactor increased as the residence time increased and the rate was 9 times faster than the batch reactor for the same yield.

In one exemplary embodiment, biodiesel is formed through a transesterification or esterification reaction wherein biomass is reacted with methanol to produce biodiesel. In exemplary embodiments, soybean oil is utilized in the transesterification reaction to produce biodiesel. In other embodiments, various other biomass can be used. For example, rapeseed oil, canola oil, jatropha oil, castor oil, vegetable oils such as corn oil, animal fats, fish oils, plant oils such as peanut oil and sunflower oil, and recycled cooking greases could all be utilized.

Transesterification reactions were run in an annular gap reactor with soybean oil and methanol. Table 6 provides the distribution by weight of the various fatty acids that are produced from soybean oil based on the measurement of 29 samples of the oil from various sources. The data characterizes soybean oil and allows one to understand the variability in the oil as it relates to any type of processing including the production of biodiesel fuels. The designation in the fatty acid column is the chain length and number of double bonds (unsaturation) in the fatty acids. For example, 18:1 designates a C18 fatty acid with a one double bond (monounsaturated). This is oleic acid which is found in virtually all vegetable oils.

If one weighs the range of the acids given in the right hand column it can be concluded that the variability overall is about ±10% in these samples. This should be kept in mind when looking at data from different samples of oil. Without knowing the specific distribution for any sample there is an inherent variability of about 10% in the concentration of the various methyl esters to be expected from the oil.

TABLE 6

Weight of Fatty Acids from 100 grams of Soybean Oil

| Fatty Acid | Weight grams/100 grams oil | Variation (%) |
|---|---|---|
| 12:0 | 0.1 | 0 |
| 14:0 | 0.2 | 0.1 |
| 16:0 | 10.7 | 1.2 |
| 18:0 | 3.9 | 0.6 |
| 20:0 | 0.2 | 0.1 |
| 16:1 | 0.3 | 0 |
| 18:1 | 22.8 | 2.7 |
| 18:2 | 50.8 | 2.1 |
| 18:3 | 6.8 | 1.6 |

It will also be noted that the weight of fatty acids add up to about 95.8 grams. These oils are triglycerides and the acids are produced by the hydrolysis of the triglycerides. For each molecule of the triglyceride during hydrolysis one adds three molecules of water and makes three molecules of the fatty acids plus one molecule of glycerol (also called glycerin or glycerine).

For the distribution in Table 6, this hydrolysis would produce 10.1 grams of glycerin and hence the general "rule of thumb" that 100 pounds of oil produces about 10 pounds of glycerin. The actual percentage of glycerin in a final sample of "crude biodiesel" (the material one obtains immediately after the transesterification) depends on the additional weight of methanol and catalyst. Under normal conditions of twice molar excess of methanol and 1.0% NaOH the amount of glycerin produced in a complete reaction is 8.75% of the weight of the crude biodiesel product before purification.

The measurement of glycerin is a simple means of determining the completeness of the biodiesel reactions. It has the added advantage that excess formation of sodium salts of fatty acids (soaps) due to either excess catalyst or further reaction in the reaction mixture do not affect the amount of glycerin and thus preservation of the samples is not as critical. Quantitative glycerin analysis can therefore be used to asses the completeness of the reaction and other initial observations on the samples can be used to estimate the formation of soaps which usually create three layers in the final crude product mixture.

All reactions that involve metallic ion catalysis generate some soap. In the analytical determination of the distribution of carboxylic acids (such as in Table 1) that can be produced from any oil, the officially adopted techniques use a very large excess of alcohol to oil (an alcohol weight on the order of 20 times the weight of oil) and an equal weight to the alcohol weight of potassium hydroxide as the catalyst. The very large excess of alcohol reduces that amount of soap formation but does not eliminate it. The methyl esters so produced are used to characterize the oil and determine the weights of the various carboxylic acids in the fraction assuming that the soaps are uniformly distributed. Since every oil sample is different, this analysis has to be performed for every sample of oil used in biodiesel production if the methyl esters themselves are to be used as a measure of the reaction completion. Even in this case one has to make the assumptions that the soaps are negligible.

The requirement for the use of acid catalysis in esterification reactions and base catalysis in transesterification reactions is well known in the literature. In the absence of any catalyst, the normal transesterification to make methyl esters would take months or years at room temperature. Although the annular gap reactor will increase this rate, it will not be as fast as the catalyzed reaction since even a 1 minute reaction in the annular gap reactor could increase the reactor equipment costs by a factor of 60 in a production environment.

The surprising result of the rate increase in this reaction can be somewhat understood if we look at the different ways a reaction can be affected kinetically. The formation of the methyl esters from the oil can be thought of as a reaction:

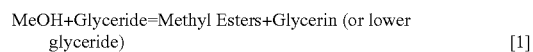

MeOH+Glyceride=Methyl Esters+Glycerin (or lower glyceride)     [1]

This reaction is catalyzed by a base which in the two cases above are either $NaOCH_3$ or NaOH. Traditionally, $NaOCH_3$ is considered a stronger base and thus in conventional usage a superior catalyst. If we write a simplified expression for the rate of formation of the methyl esters from equation [1] it could be written as:

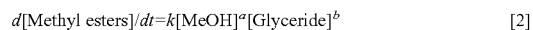

$d$[Methyl esters]$/dt = k$[MeOH]$^a$[Glyceride]$^b$     [2]

There is an expression like this for every separate triglyceride, then diglyceride and then monoglyceride in the mixture and since the fatty acids are randomly distributed this amounts to some $9^3+9^2+9=819$ separate equations only for the different glycerides even without taking into account the positional isomers which increases the number further. Only the final reaction of a monoglceyride yields glycerin and there are 27 possible monoglceyides alone when including stereoisomers.

The point of the current analysis does not change, however, for any one of those equations we would write and, therefore, it is simplified in order to facilitate understanding of the catalytic effects. The differences are not really that large and they can be estimated quite accurately from an engineering point of view by equation [2] written only three times, one for triglycerides, once for diglcyerides and finally for the monoglycerides. The exponents on the effects of concentration can be determined experimentally and this has been done for several oils by several.

To understand what a catalyst does, however, we have to look at the rate constant, k, in the equation. The larger the values of k, the faster the methyl esters are produced. For most reactions including transesterifications k takes on the form:

$$k = A \exp(-\Delta E/RT) \quad [3]$$

This expression comes from what is now called transition state theory, and it is not related to Thermodynamics even though some of the terms used are the same. Thermodynamics can only provide information on the "state" of a system and the net changes that occur going from one state to another. Pressure, volume, temperature and composition define a state. Thermodynamics is independent of the path to get from one state to another and can provide no information related to the kinetics other than the likelihood that the transition will occur or not occur. Thermodynamics can define the equilibrium distribution of products from any reaction once (and only when) that reaction has reached equilibrium.

Equation [3] is related to experimental concepts that have been used to understand reaction rates and the specific paths (and mechanisms) going from reactants to products. The expression is usually attributed to Arrhenius but various forms have been used. In this expression A is called the pre-exponential factor, $\Delta E$ is the activation energy needed to overcome the transition between the reactants and products, R is the gas constant (a universal constant) and T is the temperature in absolute degrees consistent with the units used for R and $\Delta E$.

It is common knowledge among chemists that:

1. Catalysts reduce the activation energy thereby increasing k.
2. Increasing the temperature also increases k since it appears in the denominator of the expression in the exponent.

In addition, if all else is the same, one can show that a change of 10° C. (actually 10° K. absolute which is the same increment) doubles k, a common rule of thumb used by practicing chemical engineers. Event though it is not precisely true for many reactions it provides an order of magnitude assessment that shows us that we do not expect the temperature to provide the benefits we see from the annular gap reactor.

Furthermore, it is also well known that:

1. The pre-exponential factor is related to mixing or the number of collisions per unit time of the molecules.
2. The pre-exponential factor can also contain embedded in it the concentration and exponential dependence of the catalyst.

It should be noted that the difference between the pre-exponential factor in gas phase and liquid phase reactions is considerable and collisions occur much more frequently in liquids. It is therefore tempting to say that the annular gap reactor is simply a better mixing system and therefore A increases based on increased molecular collisions per unit time. What is surprising, however, is that the effect grows to the point in the transesterification reaction where it actually overcomes the type of catalyst used and even swamps out to a large extent the effects of temperature when this chemistry is performed in the annular gap reactor.

In acid and base catalyzed reactions it is well known that the concentration of the catalyst may enter the rate constant in the form:

$$k = B[\text{catalyst}]^\beta \exp(-\Delta E/RT) \quad [4]$$

Since the catalyst is not strictly a reactant or product and for most reactions it stays relatively constant, the analysis of the catalyst concentration is frequently performed as in Equation [4]. The determination of the exponent in [4] from experimental data has been used to determine the relative quality and concentration dependence of various catalysts in esterification, hydrolysis and transesterification reactions.

A transesterification was carried out in an annular gap reactor using methanol and sodium methoxide (also called sodium methylate) as the catalyst. The reactions were performed using sodium methoxide as the catalyst with reaction times of 1.6 seconds, 0.8 seconds and 0.4 seconds. Temperature ranges were room temperature for two of the samples (1.6 and 0.8 seconds) and 71° C. and 93° C. for all three times the relative layer volumes were measured. This data can be found in Table 7. The layers are listed in volume percentage of product.

TABLE 7

Relative Layer Volumes

| Reaction Time (seconds) | Temperature | Glycerin Volume (%) | Biodeisel Volume (%) | Soap Layer Volume (%) |
|---|---|---|---|---|
| 1.6 | Room | 13 | 87 | 0 |
|  | 71° C. | 11.3 | 88.7 | 0 |
|  | 93° C. | 5 | 84 | 11 |
| 0.8 | Room | 11.2 | 88.8 | 0 |
|  | 71° C. | 11.3 | 88.7 | 0 |
|  | 93° C. | 9 | 91 | 0 |
| 0.4 | 71° C. | 11 | 89 | 0 |
|  | 93° C. | 9 | 91 | 0 |

From the table, it is seen that the 1.6 seconds of reaction time at room temperature gave the highest yield. One can also estimate that the highest temperature for the longest time resulted in too much post-reaction to form soaps. Further, one can see that the highest temperature of 93° C. resulted in less glycerin layer than the intermediate temperature of 71° C. This may be due to the fact that the highest temperature is above the boiling point of methanol and this may have interfered with adequate contact in the annular gap reactor. Analysis of the 1.6 second reaction time run at 93° C. shows that there was significant soap formation from sodium methoxide.

Table 8 presents the actual chemical analysis of the same samples.

TABLE 8

Reaction Completeness based on Glycerin Levels All Values in Percent of Theoretical Yield

| Reaction Time (seconds) | Temperature | Reaction Completeness (%) |
|---|---|---|
| 1.6 | Room | 100 |
|  | 71° C. | 75.8 |
|  | 93° C. | 99.5 |
| 0.8 | Room | 94.3 |
|  | 71° C. | 100 |
|  | 93° C. | 100 |
| 0.4 | 71° C. | 98.4 |
|  | 93° C. | 82.2 |

The reaction completeness is calculated on the basis of a theoretical yield of 8.76% of the total sample weight. Table 7 and 8 are in good agreement in terms of the quality of the reaction.

The reaction goes to completion at room temperature somewhere between 0.8 and 1.6 seconds. The reaction proceeds more quickly at 71° C. so that the 0.8 seconds is complete at that temperature and even the 0.4 seconds looks good at 71° C. The value of 91° C. is simply too high for the system as it is well above the boiling point of methanol and even at 71° C. for 1.6 seconds there appear to be artifacts in the data due to losses of the methanol probably during the reaction and possibly incomplete contact in the annular gap reactor due to vapor lock effects. The results at 0.8 seconds and 71° C. indicate that this temperature is acceptable at lower reaction times.

It should be noted that losses of methanol from the system will change the completeness of the reaction and that a gas chromatographic analysis of the methyl esters may still look "normal". The only way the methyl ester analysis could be used quantitatively is to perform a "control" experiment on the same oil sample in a manner that guaranteed complete conversion. Since those methods also involve the use of alkali metal hydroxides, the results still raise a question related to the degree of completeness based on the formation of soaps.

Tests were also run on the production of biodiesel with the use of different amounts of sodium hydroxide as the catalyst. The reactions were performed with reaction times of 1.0 seconds and 0.4 seconds. Temperature ranges were 45° C. and 93° C. Table 9 provides the qualitative analysis.

TABLE 10

Reaction Completeness based on Glycerin Levels

| Reaction Time (seconds) | Temperature | Percentage Sodium Hydroxide | Reaction Completeness (%) |
| --- | --- | --- | --- |
| 0.5 | 45° C. | 0.5 | 100 |
|  |  | 0.75 | 97.4 |
|  |  | 1 | 94.4 |
|  | 60° C. | 0.5 | 100 |
|  |  | 0.75 | 100 |
|  |  | 1 | 96.5 |
| 1.0 | 45° C. | 0.5 | 91.1 |
|  |  | 0.75 | 89.3 |
|  |  | 1 | 96.5 |
|  | 60° C. | 0.5 | 100 |
|  |  | 0.75 | 100 |
|  |  | 1 | 100 |

These results are reasonably consistent with the qualitative observations. It is to be expected that samples with high levels of soap are more difficult to analyze because of the problem of uniform mixing with the solvent. Despite this problem, reaction completion in as little as 0.5 seconds is observed. High levels of catalyst leading to high levels of soap are again detrimental. The use of low levels of simple NaOH is as good, if not better, than the sodium methoxide.

The increase in the rates due to the reactor allow for the use of less catalyst, poorer catalysts, lower temperature and reduction in unwanted side reactions at more economically favorable conditions. Transesterification reactions show that

TABLE 9

Relative Layer Volumes using Sodim Hydroxide

| Reaction Time (seconds) | Temperature | Percentage Sodium Hydroxide | Glycerin Volume (%) | Biodeisel Volume (%) | Soap Layer Volume (%) |
| --- | --- | --- | --- | --- | --- |
| 0.5 | 45° C. | 0.5 | 12.5 | 87.5 | 0 |
|  |  | 0.75 | 13 | 87 | 0 |
|  |  | 1 | 11.2 | 74.5 | 14.3 |
|  | 60° C. | 0.5 | 13.5 | 86.5 | 0 |
|  |  | 0.75 | 13.3 | 86.7 | 0 |
|  |  | 1 | 2 | 80.7 | 17.3 |
| 1.0 | 45° C. | 0.5 | 13.3 | 86.7 | 0 |
|  |  | 0.75 | 13.3 | 86.7 | 0 |
|  |  | 1 | 5 | 73 | 22 |
|  | 60° C. | 0.5 | 9.2 | 89.8 | 0 |
|  |  | 0.75 | 14 | 86 | 0 |
|  |  | 1 | 2 | 80.7 | 17.3 |

Through analysis of Table 9, a base catalyst is required to greatly speed up the reaction, the side reaction to form the soap dictates that only the least amount needed should be used to avoid the inevitable loss of fatty acid. It is clear that clean products result even at 0.5% NaOH and that a reaction time near 1.0 second gives higher conversion. From this data, it is seen that a reaction time near 1.0 seconds at 0.75% NaOH and 45° C. or 0.5 seconds at 0.75% NaOH and 60° C. will lead to reaction completion with clean products.

Table 10 provides the analytical data for the samples of Table 9.

the type of mixing and intimate contact conferred by the reactor outweighs any of the normal factors associated with increasing the rate constant.

In particular, use of sodium hydroxide in place of sodium methoxide is seen to be at least as efficient, and in some cases more efficient, for the production of biodiesel in an annular gap reactor. Sodium Hydroxide is about 1/10th the cost of sodium methoxide. Consequently, production of actual biodiesel from soy bean oil is lowered by use of the annular gap reactor described herein. The catalyst expense is 1 to 2 cents per gallon of biodiesel produced via the annular gap reactor when sodium hydroxide is used. Expenses are 8 to 9 cents per gallon when sodium methoxide is used as a catalyst in other production processes. Accordingly, use of the annular gap reactor greatly reduces the cost of production.

While the above description contains many particulars, these should not be consider limitations on the scope of the invention, but rather a demonstration of implementations thereof. Accordingly, it is not intended that the scope of the disclosure in any way be limited by the above description. The various elements of the claims and claims themselves may be combined any combination, in accordance with the teachings of the present disclosure, which includes the claims.

What is claimed is:

1. A method to efficiently conduct esterification and transesterification reactions comprising:
   providing an annular gap reactor to provide more efficient mixing, wherein the annular gap reactor is operating in laminar flow conditions in the absence of Taylor vortices;
   providing an evaporator attached to the annular gap reactor, the evaporator including an opening in the stator near an end of the reactor and a series of fins placed in the opening to allow gasses and vapors to leave the reactor and prevent fluids from leaving the reactor;
   providing a condenser placed above the opening to collect the gasses and vapors leaving the reactor;
   introducing reactants into the annular gap reactor; and
   mixing the reactants to produce the desired ester.

2. A method to efficiently conduct esterification and transesterification reactions comprising:
   providing an annular gap reactor to provide more efficient mixing, the annular gap reactor comprising a rotor rotating in a direction within a stator to provide an annular flow passage comprising a flow path containing a high-shear treatment zone in which the passage spacing is smaller than in the remainder of the zone to provide a subsidiary higher-shear treatment zone, wherein the annular gap reactor is operating in laminar flow conditions in the absence of Taylor vortices;
   providing an evaporator attached to the annular gap reactor, the evaporator including an opening in the stator near the end of the reactor and a series of fins placed in the opening, the series of fins each having a bottom curved in the direction of the rotor rotation;
   introducing reactants into the annular gap reactor; and
   mixing the reactants to produce the desired ester.

3. The method of claim 2 further comprising:
   providing a condenser placed above the opening to collect gasses and vapors leaving the reactor.

4. The method of claim 1 wherein the reactants include an alcohol and an acid.

5. The method of claim 4 wherein the product includes an ester.

6. The method of claim 1 wherein the reactants include an alcohol and base.

7. The method of claim 1 wherein the system increases efficiency and reduces costs when compared to traditional batch reactors by increasing reaction rates.

8. The method of claim 1 wherein the system increases efficiency and reduces costs when compared to traditional batch reactors by utilizing less expensive catalysts.

9. The method of claim 1 wherein the system increases efficiency and reduces costs when compared to traditional batch reactors by operating at lower temperatures.

10. The method of claim 1 wherein one reactant or combination of reactants is selected from the group including soybean oil, rapeseed oil, canola oil, jatropha oil, castor oil, corn oil, other vegetable oils, animal fats, fish oils, poultry oils and recycled cooking greases, and a second reactant is methanol.

11. The method of claim 10 wherein the products include biodiesel and glycerin.

12. The method of claim 10 further comprising the addition of a catalyst.

13. The method of claim 12 wherein the catalyst includes sodium hydroxide.

14. The method of claim 13 wherein the amount of sodium hydroxide catalyst to achieve the ASTM D6751 specification for biodiesel in less than 1 second reaction time is less than traditional batch reactors.

15. The method of claim 13 wherein the system avoids the formation of a byproduct, the byproduct including soap.

* * * * *